DE WITT NELSON & H. C. STEELE.
TRACTION BELT.
APPLICATION FILED MAR. 6, 1916.
1,292,854.
Patented Jan. 28, 1919.
2 SHEETS—SHEET 1.
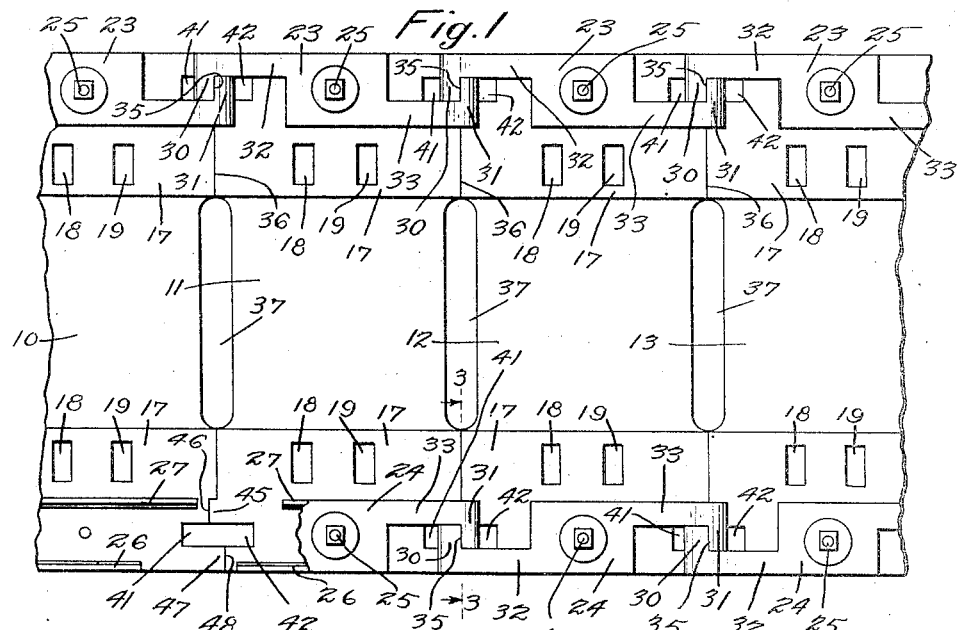
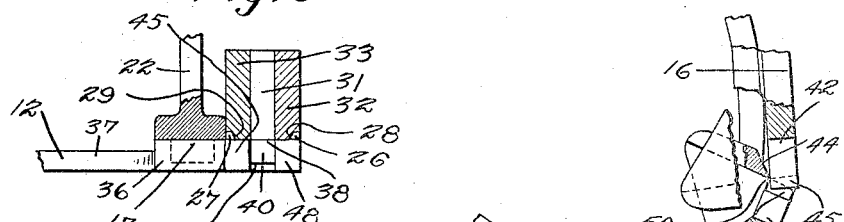
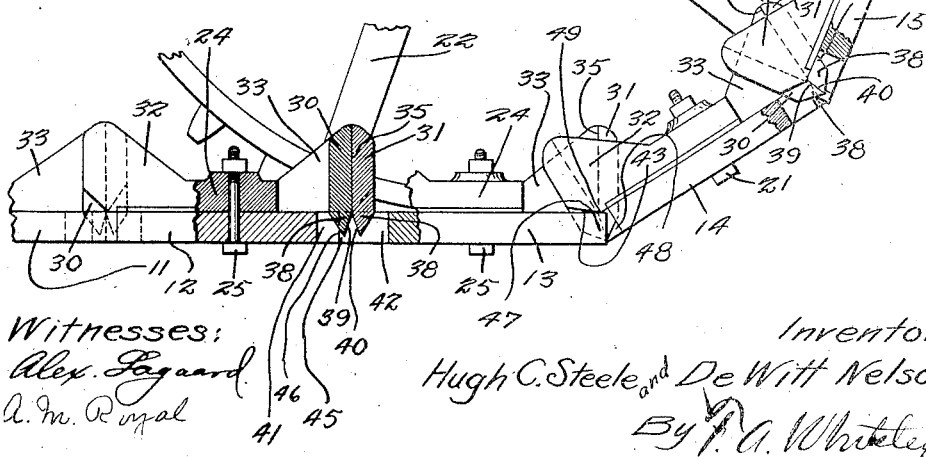
Witnesses:
Alex. Fagaard
A. M. Royal
Inventors:
Hugh C. Steele and De Witt Nelson
By T. A. Whiteley
their Attorney

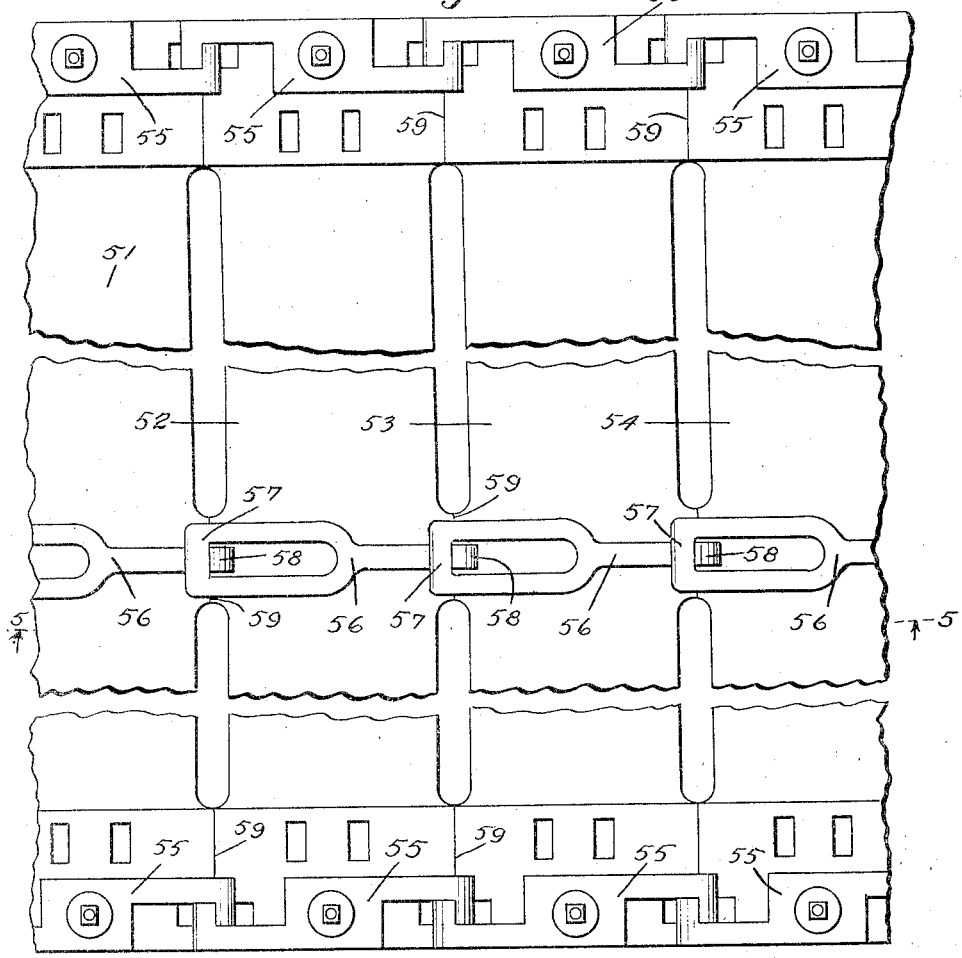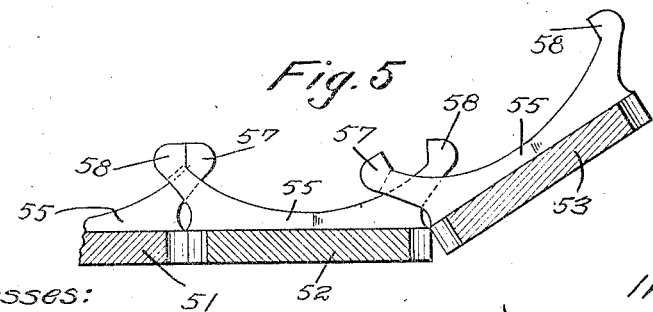

UNITED STATES PATENT OFFICE.

DE WITT NELSON AND HUGH C. STEELE, OF MINNEAPOLIS, MINNESOTA, ASSIGNORS TO TOM THUMB TRACTOR COMPANY, OF MINNEAPOLIS, MINNESOTA, A CORPORATION.

TRACTION-BELT.

1,292,854.      Specification of Letters Patent.      Patented Jan. 28, 1919.

Application filed March 6, 1916. Serial No. 82,286.

*To all whom it may concern:*

Be it known that we, DE WITT NELSON and HUGH C. STEELE, citizens of the United States, residing at Minneapolis, in the county of Hennepin and State of Minnesota, have invented certain new and useful Improvements in Traction-Belts, of which the following is a specification.

Our invention relates to traction belts for what are known as the caterpillar type of traction engines and has for its object to provide such a belt which shall be constructed of a plurality of plates or slats so interconnected at their joints that such slats may pivot in one direction while in the other direction the slats will be held rigid with their outer surfaces in a given plane. The entire belt is driven by sprocket wheels having lugs engageable in apertures in the slats so that the slats not only are held together to hold the belt as a whole, but said belt is driven without the employment of any sprocket chains, cables or similar devices.

The full objects and advantages of our invention will appear in connection with the detailed description thereof and are particularly pointed out in the claims.

In the drawings, illustrating the application of our invention in one form,—

Figure 1 is a plan view of an out-stretched portion of our improved caterpillar belt with some parts removed. Fig. 2 is a side elevational view of the belt shown in Fig. 1, part of which is shown to pass about one of the drive sprockets. Fig. 3 is an end elevational sectional view of the tractor belt taken on line 3—3 of Fig. 1, including some of the drive sprockets not shown in that figure. Fig. 4 is a plan view of a caterpillar belt similar to that shown in Fig. 1 but having additional interlocking members. Fig. 5 is a sectional elevational view of some of the parts shown in Fig. 4 taken on line 5—5 of Fig. 4 with one of the elements in an altered position.

Our improved caterpillar belt, as best shown in Figs. 1 and 2, comprises a plurality of transverse slats 10, 11, 12, 13, 14, 15 and 16, etc., which are situated adjacent each other, as shown in Fig. 1, to form said belt. Each slat has a thickened portion 17 at each end through which extend pairs of holes 18 and 19 by which the belt is driven from pairs of teeth 20 and 21 on sprocket wheels 22. As the slats travel about the wheels 22 they remain tangent to them at their centers only, and for this reason the holes 18 and 19 are grouped together at the center where they will most effectively be engaged by the teeth 20 and 21.

At the ends of each slat are located interlocking blocks 23 and 24, blocks 23 being similar to blocks 24 excepting that the parts thereof are reversed so that one set are what might be termed right-handed and the other set left-handed. These blocks are rigidly bolted to the thicker portions 17 of said slats by means of bolts 25 and are guided in place and kept from rotating by ridges 26 and 27 integral with the slats and fitting into grooves 28 and 29 in the edges of said blocks, as best shown in Fig. 3.

Power is transmitted through the belt by means shown in Figs. 1 and 2. The blocks 23 and 24 have hook portions 30 and 31 at their ends issuing from parts 32 and 33 extending from the centers of said blocks. It will be noted that when the blocks are in place and the belt slats assembled and lie flat, as shown in Fig. 1, that the hook portions 30 and 31 are in contact at the surfaces 35, said surfaces extending substantially perpendicularly from the tops of the parts 32 and 33 to the top of the thickened portion 17 of the slats and in line with the edges 36 of the previously-mentioned slats. Tension is hence transmitted throughout the belt through hooks 30 and 31 and compression through the edges 36. These edges may, however, be cut away at 37 to reduce the actual contact surface, as shown in Fig. 1.

To allow the belt to bend, the extreme lower portion 38 of each of the hook portions 30 and 31 is made wedge shape and the surfaces 39 and 40 are caused to roll together as the belt mounts the sprocket wheel, changing the surface of contact from 35 to 39 and 40. Slats 14 and 15 in Fig. 2 are shown in this position, and slats 12 and 13 in the same figure are shown in the straight-line position. The point of pivot, or the hinge line of the slats, is substantially the upper corner of edge 36, coincident with the top surface of portion 17, where, it will be seen, the taper of the wedge portion 38 commences. The thickened portions 17 are cut away at 41 and 42 to give the wedge-shaped extremities 38 of the hooked portions 30 and 31 sufficient operating space. To allow the parts 32 and 33 to take the positions shown by those attached to slats 13 and 14 in Fig.

2, the same are cut away at 43 and 44, so that the various elements will effectively operate to move from the straight-line position to the curved position clearly illustrated in said figure.

To prevent the slats from sliding apart transversely, or along the edges 36 and surfaces 35, each of the slats is provided at 17 on one side with a protrusion 45 and a recess 46, and at the other side with a similar protrusion 47 and a similar recess 48, so situated that the protrusion 45 of one slat fits into the recess 46 of the next, and similarly the protrusion 47 of one slat fits into the recess 48 of the next slat. These protrusions, as will be noted in Fig. 1, as shown on slats 10 and 11, come in line with the parts 32 and 33 and, as best shown in Fig. 2, pass under the corners 49 and 50 formed by the cutaway portions 43 and 44 and the main body of the parts 32 and 33. As these corners lie along the line of pivot of the hook members it will be comprehended that they ride on the projections 45 and 47 and so prevent the parts from disengaging. To remove the belt elements it is, hence, necessary to first detach the interlocking blocks 24, which is easily done by means of bolts 25.

When a very long slat is used we find it necessary to employ additional interlocking members, which may be formed and situated as shown in Fig. 4. Here the ordinary slats 51, 52, 53 and 54 are linked together with the regular interlocking blocks 55, the same as were shown in Fig. 1. In addition to the same, blocks 56 are cast integral with the slats 51, 52, etc., and are provided with looped portions 57 at one end and hooked portions 58 at the other end which engage the respective parts of adjacent slats, as shown in Fig. 5. The edges 59 of the slats are continued in proximity with these additional interlocking blocks so that the slats at those points are also given substantial compression-contact surfaces. In this case means are omitted for retaining the members from transverse sliding so that the same may be easily slipped in place and the blocks 56 can hence be cast integral with the slats.

The advantages of our improved form of caterpillar belt lie mainly in the simplicity of operation and construction and the durability of the wearing parts, and to this end is the device provided.

We claim:

1. A traction belt for caterpillar type traction engines comprising a plurality of separate plates positioned side by side, each plate having an ear projecting into the edge of the adjacent plate, and hook members secured to said plates for interconnecting the same and holding the plates against pressure in one direction, said members being provided with overhanging portions engaging the ears on the plates adjacent the one to which the member is attached to limit the relative facial movement of the plates.

2. A traction belt for caterpillar type traction engines comprising a plurality of separate plates having registering slots on the edges thereof forming a cavity, a pair of lugs formed on said plates adjacent said cavity, one on each side thereof and issuing in opposite directions from said plates and each extending into the opposite plate, and members secured to said plates having overlapping portions engaging the lugs of the opposite plates and depending hook portions for holding the belt in longitudinal alinement extending into said slots and engaging the walls of the slots of the plates opposite those to which said members are secured.

3. A traction belt for caterpillar type traction engines comprising a plurality of separate plates each having portions offset from the line of junction of the plate and being provided with interconnecting slots adjacent the ends of said plates, and members rigidly secured to the ends of the plates and having overlapping hooks with dependent portions extending into said slots.

4. A traction belt for caterpillar type traction engines comprising a plurality of separate plates each having portions offset from the line of junction of the plate and being provided with interconnecting slots adjacent the ends of said plates, and members rigidly secured to the ends of the plates and having overlapping hooks with dependent portions extending into said slots, said dependent portions being formed with relatively obliquely-disposed adjacent walls.

5. A traction belt for caterpillar type traction engines comprising a plurality of separate plates each being provided with interconnecting slots adjacent the ends of said plates, and members rigidly secured to the plates and having laterally overlapping portions with extensions therefrom into said slots.

6. A traction belt for caterpillar type traction engines comprising a plurality of separate plates each being provided with interconnecting slots adjacent the ends of said plates, and members rigidly secured to the plates and having laterally overlapping portions with extensions therefrom into said slots, said extensions being formed with relatively obliquely-disposed adjacent walls.

In testimony whereof we affix our signatures in presence of two witnesses.

DE WITT NELSON.
HUGH C. STEELE.

Witnesses:
H. A. BOWMAN,
ALEX LAGAARD.